US005721536A

United States Patent [19]

Mulqueen

[11] Patent Number: 5,721,536

[45] Date of Patent: Feb. 24, 1998

[54] AUDIO/VIDEO PRICE CONFIRMATION SYSTEM

[76] Inventor: Dennis E. Mulqueen, 6668 Knightsbridge Ave., Canton, Ohio 44718

[21] Appl. No.: 647,666

[22] Filed: May 15, 1996

Related U.S. Application Data

[63] Continuation-in-part of Ser. No. 516,977, Aug. 18, 1995, Pat. No. 5,579,000, which is a continuation of Ser. No. 188,597, Jan. 26, 1994, abandoned, which is a continuation of Ser. No. 41,526, Apr. 1, 1993, abandoned, which is a continuation of Ser. No. 896,458, May 26, 1992, abandoned, which is a continuation of Ser. No. 302,781, Jan. 30, 1989, abandoned.

[51] Int. Cl.[6] ..................... H04Q 1/00

[52] U.S. Cl. ..................... 340/825.3; 340/825.35; 340/286.06; 348/150; 348/148; 348/14

[58] Field of Search ..................... 340/825.3, 825.35, 340/825.34, 825.06, 286.06, 534; 364/400, 464.01; 395/201, 216, 220; 235/378; 382/100, 143; 186/52, 59; 348/61, 135, 136, 137, 143, 150, 14; 345/2; 356/396; 386/46

[56] References Cited

U.S. PATENT DOCUMENTS

| | | | |
|---|---|---|---|
| 3,863,245 | 1/1975 | Swinamer et al. | 340/286.06 |
| 3,935,380 | 1/1976 | Coutta | 348/150 |
| 4,120,004 | 10/1978 | Coutta | 348/150 |
| 4,225,881 | 9/1980 | Tovi | 348/151 |
| 4,511,886 | 4/1985 | Rodriguez | 340/534 |
| 4,745,472 | 5/1988 | Hayes | 348/141 |

FOREIGN PATENT DOCUMENTS

| | | | |
|---|---|---|---|
| 2140650 | 11/1984 | United Kingdom | 395/216 |

*Primary Examiner*—Edwin C. Holloway, III
*Attorney, Agent, or Firm*—Renner, Kenner, Greive, Bobak, Taylor & Weber

[57] ABSTRACT

An audio/video price confirmation system is disclosed for implementation in retail department stores and the like. A display is maintained in close proximity to the checkout stations of the store. The display area includes a vidicon which is maintained above a dimensionalized grid upon which unpriced items may be placed. Also at the display area is an audio intercom. The intercom and vidicon communicate with remote stations throughout the department store, typically one such station in each department. A cashier may then place an unpriced item on the grid, transmit its image to the appropriate department, and communicate with personnel in that department to ascertain the price of the item. A recording system may also be connected to the intercom and vidicon so that appropriate corrective action may be taken regarding the remaining unpriced items or other discrepancies associated therewith.

8 Claims, 1 Drawing Sheet

AUDIO/VIDEO PRICE CONFIRMATION SYSTEM

RELATED APPLICATIONS

This is a continuation-in-part of prior application Ser. No. 08/516,977, filed Aug. 18, 1995, now U.S. Pat. No. 5,579,000, which is a continuation of prior application Ser. No. 08/188,597, filed Jan. 26, 1994, which is now abandoned and which is a continuation of prior application Ser. No. 08/041,526, filed Apr. 1, 1993, which is now abandoned and which is a continuation of prior application Ser. No. 07/896,458 filed May 26, 1992, which is now abandoned and which is a continuation of prior application Ser. No. 07/302,781, filed Jan. 30, 1989, which is now abandoned.

TECHNICAL FIELD

The invention herein resides in the art of audio/video systems and, more particularly, to such a system as may be employed in retail sales establishments to facilitate the determination of pricing or the correction of identifying information of various items. Specifically, the invention relates to a centralized display area having audio/video communications with remote areas throughout the sales establishment, allowing for ease of communication between the two and for recording the same.

BACKGROUND OF THE INVENTION

Anyone who has shopped at a supermarket or department store has been confronted with the situation in which the cashier at the checkout area is unable to determine the price or identification number of an item to be purchased. The cashier is then required to page a clerk or manager from the department in the store from which the item originated, requesting the presence of that individual at the checkout station. Occasionally, the clerk or manager, upon reaching the checkout station and seeing the product, is able to advise the cashier as to the price. However, the problem becomes aggravated on occasion when the clerk or manager does not know the price or identification number, but must return to his department to make that determination. The individual must then again return to the checkout counter to apprise the cashier of the correct information. In the most automated of stores, once the clerk or manager has returned to his department to determine the price, he may use an intercom, paging system, or telephone to advise the cashier of the same.

In any of the events described above, there is a significant cost of time, money, and customer aggravation over the process. Such a process is inefficient, requiring the employment of additional personnel, increasing the overhead of the retail facility. More importantly, however, such process is time consuming and aggravating to the customer who, experiencing this on several occasions, may determine not to shop at the store.

It is apparent that there is a need in retail establishments for a more automated means for making "price checks" at the cashier or checkout station. Such a system is necessary for the benefit of both the retailer and the consumer.

SUMMARY OF INVENTION

In light of the foregoing, it is a first aspect of the invention to present an audio/video price confirmation system which eliminates the need for travel of department personnel to the checkout stations.

Another aspect of the invention is the provision of an audio/video price confirmation system which reduces the time and cost of "price checks," wherein a "price check" may include ascertaining identification information of the article or resolving other discrepancies.

Still a further aspect of the invention is the provision of an audio/video price confirmation system which allows audio and video communications between the checkout personnel and the personnel of the various departments within the retail establishment.

Still another aspect of the invention is the provision of an audio/video price confirmation system which allows wireless audio and video communication between the checkout personnel and the personnel of the various departments within the retail establishment and for communications between the retail establishment and a main office.

Yet another aspect of the invention is the providing of an audio/video price confirmation system which employs a video cassette recorder to record errors which may exist in the labeling of products and the like so the appropriate corrective action may be taken at the retail establishment, the main office and at any warehouse location.

Yet a further aspect of the present invention is the provision of a portable cart which carries another video cassette recorder to play back the recorded discrepancies and allow department personnel to take the necessary corrective action and wherein the cart carries a printer that may be employed to print the appropriate bar code labels if needed.

Yet an additional aspect of the invention is the provision of an audio/video price confirmation system which is cost effective, easy to implement in existing establishments, and capable of being deployed by use of state of the art equipment.

The foregoing and other aspects of the invention which will become apparent as the detailed description proceeds are achieved by a price confirmation system in a retail establishment providing video and audio communication links, comprising: at least one checkout station having a cash register and a checkout counter; a display area in close proximity to the checkout station, but excluding the checkout station therefrom, the display area comprising a cross-hatched grid having a pattern of crossed-hatching between one-half inch and five inches, the crosshatched grid receiving thereon an article of unknown price, the cross-hatched grid maintained on a support surface, a video camera positioned above the crosshatched grid for viewing just the article of unknown price and the cross-hatched grid and generating a color video image of the article disposed on the crosshatched grid, the video camera adjustable to properly show the nature and size of the article to be priced, a video display screen for displaying the video color image of the article disposed on the cross-hatched grid; a video communication link interconnecting the video camera to the video display screen and an audio transceiving device; a plurality of remote stations displaced from the checkout station and the display area, each of the plurality of remote stations comprising a remote video display screen connected to the video communication link for receiving and displaying the color video image of the article disposed on the crosshatched grid, and a remote transceiving device interconnected by an audio communication link to the audio transceiving device; and a system connected to one of the video communication link and the audio communication link to record communication between an individual at one of the plurality of remote stations with an individual at the display area.

Yet other aspects of the invention are attained by method for confirming a price in a retail establishment comprising the steps of: providing at lease one checkout station having a checkout counter and a cash register operated by a cashier; accessing a display area by the cashier with an article of unknown price, the display areas comprising a support surface on which is maintained a crosshatched grid having a pattern of cross-hatching between ½ inch and 5 inches, a video camera positioned above the cross-hatched grid, the video camera generating a color video image, a video display screen for receiving and displaying the color video image, a video communication link interconnecting the video camera to the video display screen, and an audio transceiving device; placing the article of unknown price on the cross-hatched grid; viewing with the video camera just the article of unknown price and the cross-hatched grid, the color video image displayed on the video display screen; transmitting the color video image to one of a plurality of remote stations, the remote station accessible by a clerk, the remote station having a remote video display screen connected to the video communication link for displaying the color video image, and a remote audio transceiving device interconnected by an audio communication link to the audio transceiving device; viewing the remote video display screen by the clerk; communicating with the transceiving device and the remote audio transceiving device between the cashier and the clerk, respectively, the cashier and the clerk confirming the price of the article; and recording video images and audio communications between the clerk and the cashier transmitted by the video communication link and the audio communication link.

BRIEF DESCRIPTION OF THE DRAWINGS

For a complete understanding of the objects, techniques and structure of the invention, reference should be had to the following detailed description and accompanying drawing wherein.

PREFERRED EMBODIMENT FOR CARRYING OUT THE INVENTION

Figure 1:
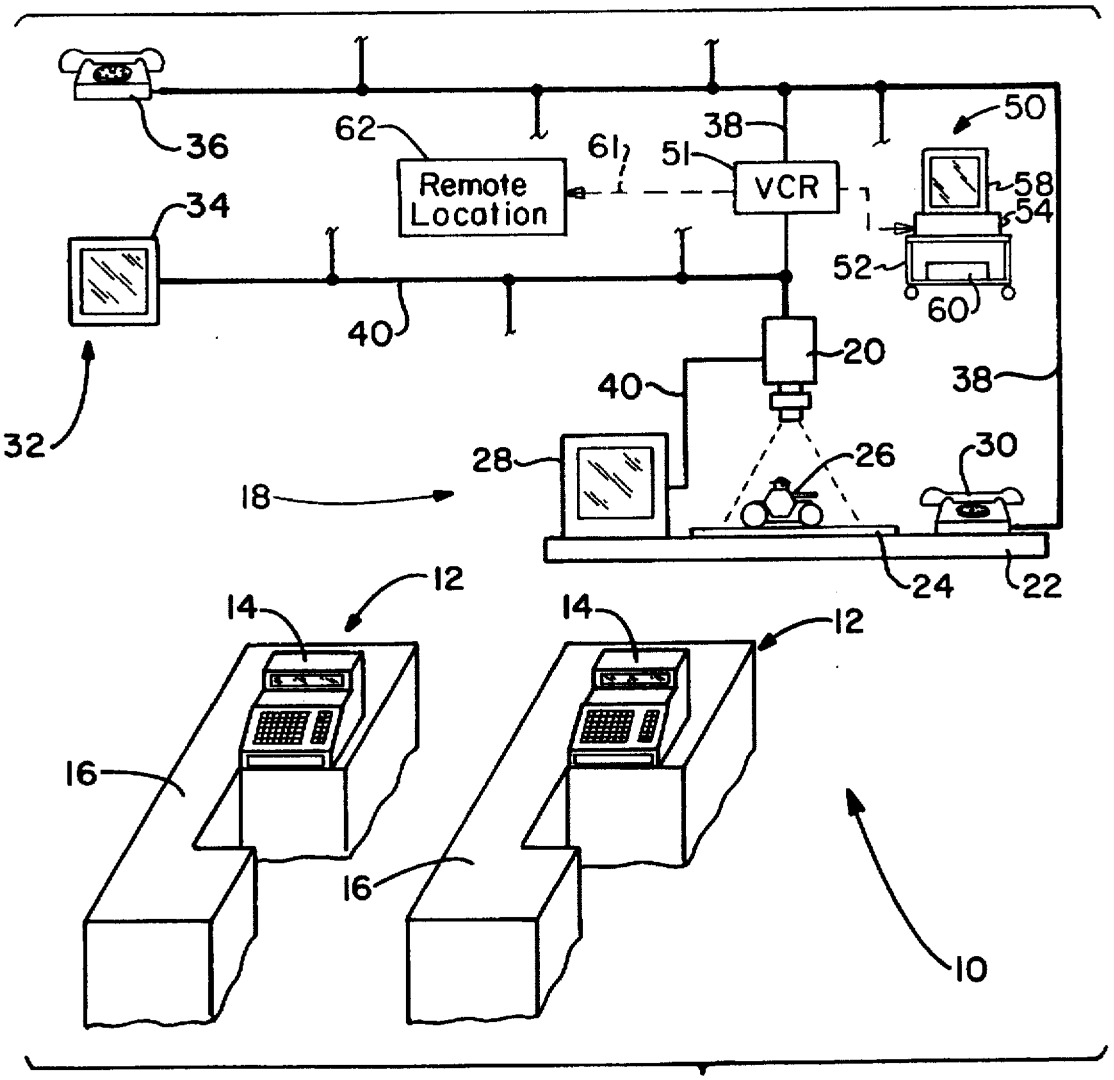
FIG. 1 is an illustrative view of the audio/video price confirmation system of the invention.

Referring now to the drawings and more particularly FIG. 1, it can be seen that an audio/video price confirmation system according to the invention is designated generally by the numeral 10. Such a system would typically be placed in the environment of a retail facility such as a grocery store or department store, but the utilization of the same is equally advantageous in smaller facilities. In any such facility, one or more checkout stations 12 would typically be present, each of the same including a cash register 14 and a checkout counter 16. In standard fashion, a customer, having selected goods from various departments within the store, will bring them to the one of the checkout stations 12 where a cashier will total the prices of the items to be purchased and the sale will be consummated by the exchange of payment for the goods.

According to the invention, a display area 18 is positioned in close proximity to the checkout stations 12. In the event that only a single checkout station is employed in the establishment, a display area 18 may be positioned at the checkout station. However, where a plurality of such stations are employed, a single display area 18 may be centrally located with respect thereto, and preferably within 5–50 feet of each of the checkout stations 12.

As shown, the display area 18 includes a video camera 20 such as a vidicon, which is positioned above a table or support surface 22. preferably, the vidicon 20 will include a "zoom" or adjustable telescopic lens such that the field of view may be adjusted and the size of the items being viewed may be increased or decreased.

Maintained upon the surface 22 is a grid 24 which is positioned directly beneath the vidicon 20 and within its field of view. An article or item which is desired to be purchased, but the price or other identifying information of which is unknown to the cashier, may be placed upon the grid 24 and within the field of view of the ridicon 20. A cathode ray tube (CRT) or appropriate video display screen 28 is also maintained on the surface 22 and is interconnected with the vidicon 20 to display on the screen the field of view of the camera. Finally, a telephone, intercom, or other appropriate audio signal transmitting or receiving device 30, hereinafter transceiving device 30, is also maintained at the display area 18, as shown.

It will further be seen from FIG. 1 that a plurality of remote stations 32, only one being shown in the drawing, are positioned throughout the store in the various departments. Each of the remote stations 32 includes a CRT or appropriate video display screen 34 and a transceiving device 36 similar to the transceiving device 30. As shown, the transceiving device at the remote station is interconnected with the transceiving device at the display area 18 by means of a line 38, which also services the transceiving device 36 at various other remote stations 32 positioned in the various departments throughout the store. In like manner, the line 40 interconnects the vidicon 20 with the screen 34 at each of the various remote stations 32 in the various departments throughout the store. It will also be noted that the line 40 interconnects the vidicon 20 with the display screen 28 such that the display screen 28, as well as the screens 34, all display the field of view of the vidicon 20.

From the foregoing, it will be appreciated that audio and video communications may now be had from the display area 18 to each of a plurality of remote stations 32 by means of the ridicon 20, display screen 28, transceivers 30 and 36, and remote screens 34. A cashier at the display area 18, as well as a clerk or department manager at a remote area 32, may thus verbally communicate with each other through the intercom system, while viewing the same item over the display screen.

Figure 2:
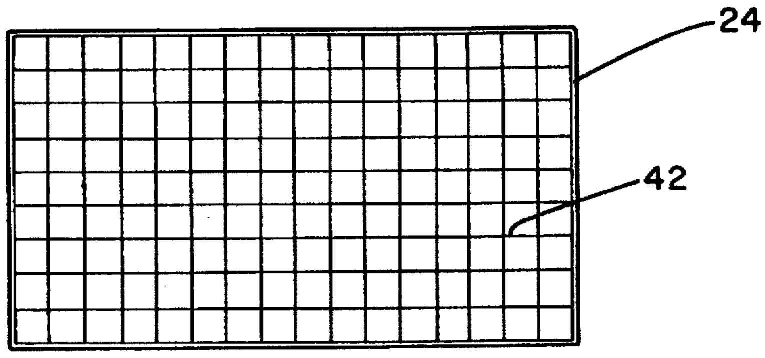
FIG. 2 is a top plan view of the dimension grid employed in the system of FIG. 1.

With reference now to FIG. 2, it can be seen that the grid 24 is preferably a cross-hatched pattern 42, with the cross hatches scaled appropriately such that the size of the item 26 placed thereon can be readily perceived. In preferred embodiments of the invention, the grid 24 will comprise a pattern having cross-hatching of ½"–5" dimensions, depending upon the types of articles sold at the retail establishment. Size designations may be imprinted directly on the grid 24.

In use, a cashier at a checkout station 12, confronted with an unidentified article of unknown price, simply accesses the display area 18 and places the item on the grid 24. The "zoom" or telescopic lens of the vidicon 20 is then adjusted such that the display screen 28 adequately shows the item on the cross-hatch pattern 42 such that its nature and size can be determined. Communication is then made with a clerk or manager in the appropriate department by means of the transceivers 30 and 36. The clerk or manager in the department views the article on the screen 34 at the remote station 32 and, if the price is not readily known to the clerk or manager, he can access the display area of that product to make the price determination or other clarification and communicate the same to the cashier. Of course, if necessary, the orientation of the item 26 may be changed to suit the needs of the department clerk or manager, as by laying the item 26 on its side, top, back, or the like as requested through the transceiver. It is also preferred that the ridicon 20 be able to transmit, and the display screens 28, 34 be able to receive and display, color images. This is desirable since color may often assist in the identification and pricing of the items 26.

To further enhance the effectiveness of the price confirmation system 10, a recording and playback system 50 may be connected thereto. Primarily, the recording and playback system 50 is employed to make a record on video tape or other recording medium of errors which may exist in the labeling of the products and the like so that mislabeled products or other problems can be reviewed at the end of the day and appropriate corrective action taken. For example, if a product is identified with a defective bar code, this can be noted by the repeated inquiry as to the price respecting the product. The bar code labels can then be changed and reapplied to the product at a convenient time, such as when the store is closed. Moreover, this record of a misidentified article can be transmitted to various remote locations, such as other stores, a central office or a warehouse to name a few, so that appropriate corrective action can be taken at these other facilities.

The system 50 includes a video cassette recorder (VCR) 51 that is connected to the ridicon 20 via line 40 and to the audio transceiving devices 30 and 36 via line 38. The system 50 also includes a portable cart 52 which can be wheeled about the retail establishment as needed. The portable cart 52 has several shelves, one of which carries a video cassette recorder (VCR) 54 that plays back the audio and video information recorded on VCR 51. Other information such as date and time can be inserted into the video image by the VCR 51. A monitor 58 is also carried by the portable cart 52 and is connected to the VCR 54 for displaying the audio and visual recording of the discussions between the clerk and the cashier as to the proper identification or pricing of an unidentified article. A label printer 60 is also carried by the portable cart 52. It will be appreciated that VCR 51 and VCR 54 may be one in the same and detachable from the lines 38 and 40 when the cart is moved.

At the end of the day a clerk may listen to and watch the communication between the clerks and the cashiers on the VCR 54 and identify the locations of the misidentified products and investigate what corrective action needs to be taken to the similar remaining articles. If it is determined that a defective label is on the misidentified product, the clerk can print correct labels on the label printer 60. The clerk can also take other corrective action such as repackaging the product or pulling the articles in question off the shelf. Once the corrective action has been taken, the clerk can view the next price/identification confirmation sequence played on the VCR 54 and the monitor 58 and move the cart 52 to the aisle containing the next misidentified article.

A remote communication link 61 may transmit to a remote location 62 all of the audio and video communications regarding a misidentified article recorded by the VCR 51. Accordingly, the appropriate personnel at the remote location 62 can determine if their same articles are also misidentified. It will also be appreciated that the clerk investigating the misidentified article in question may decide that other corrective action may be needed.

It will be readily perceived by those skilled in the art that the concept of the invention may be employed in embodiments different from those presented in the preferred embodiment above. Indeed, appropriate radio frequency signals or video signals may be transferred through the air, without wires and by means of transmitting and receiving antennas, for the transceiving system and the video portion of the system. The method by which the audio and video signals are transmitted from the display area 18 to the remote stations 32 may vary within the context of the invention. Additionally, other recording and playback devices may be used in place of the VCR's 51 and 54.

Thus it can be seen that the objects of the invention have been satisfied by the structure presented hereinabove. While in accordance with the patent statutes, only the best mode and preferred embodiment of the invention has been presented and described in detail, it will be understood that the invention is not limited thereto or thereby. Accordingly, for an appreciation of the true scope and breadth of the invention, reference should be had to following claims.

What is claimed is:

1. A price confirmation system in a retail establishment providing video and audio communication links, comprising:
   - at least one checkout station having a cash register and a checkout counter;
   - a display area in close proximity to said checkout station, but excluding said checkout station therefrom, said display area comprising:
     - a cross-hatched grid having a pattern of cross-hatching between one-half inch and five inches, said cross-hatched grid receiving thereon an article of unknown price, said cross-hatched grid maintained on a support surface;
     - a video camera positioned above said cross-hatched grid for viewing just the article of unknown price and said cross-hatched grid and generating a color video image of the article disposed on said cross-hatched grid, said video camera adjustable to properly show the nature and size of the article to be priced;
     - a video display screen for displaying said video color image of the article disposed on said cross-hatched grid;
     - a video communication link interconnecting said video camera to said video display screen; and
     - an audio transceiving device;
   - a plurality of remote stations displaced from said checkout station and said display area, each of said plurality of remote stations comprising:
     - a remote video display screen connected to said video communication link for receiving and displaying said color video image of the article disposed on said cross-hatched grid; and
     - a remote audio transceiving device interconnected by an audio communication link to said audio transceiving device; and
   - a system connected to one of said video communication link and said audio communication link to record communication between an individual at one of said plurality of remote stations with an individual at said display area.

2.The price confirmation system according to claim 1 wherein said system comprises:
   - a video cassette recorder connected to said video communication link and said audio communication link; and
   - a video monitor connected to said video cassette recorder for playing the recorded communication.

3. The price confirmation system according to claim 2 further comprising:

wheeled cart for carrying said video cassette recorder, said video monitor and a label printer, wherein an individual plays the recorded communication and investigates the discrepancy associated with the article, said label printer used to print new labels to properly identify the article.

4. The price confirmation system according to claim 2 further comprising:

a remote communication link for connecting said recording system to a remote location, wherein individuals at said remote location can take corrective action based upon the recorded communication.

5. A method for confirming a price in a retail establishment comprising the steps of:

providing at least one checkout station having a checkout counter and a cash register operated by a cashier;

accessing a display area by the cashier with an article of unknown price, said display areas comprising;

a support surface on which is maintained a cross-hatched grid having a pattern of cross-hatching between one-half inch and five inches;

a video camera positioned above said cross-hatched grid, said video camera generating a color video image;

a video display screen for receiving and displaying said color video image;

a video communication link interconnecting said video camera to said video display screen; and an audio transceiving device;

placing the article of unknown price on said cross-hatched grid;

viewing with said video camera just said article of unknown price and said cross-hatched grid, said color video image displayed on said video display screen;

transmitting said color video image to one of a plurality of remote stations, said remote station accessible by a clerk, said remote station having a remote video display screen connected to said video communication link for displaying said color video image, and a remote audio transceiving device interconnected by an audio communication link to said audio transceiving device;

viewing said remote video display screen by the clerk;

communication with said audio transceiving device and said remote audio transceiving device between the cashier and the clerk, respectively, the cashier and the clerk confirming the price of the article; and recording video images and audio communications between the clerk and the cashier transmitted by said video communication link and said audio communication link.

6. The method according to claim 5, wherein said recording step comprises the steps of:

providing a video monitor which is connected to a video cassette recorder that records images from said video communication link and audio signals from said audio communication link; and investigating the article discussed by the clerk and the cashier in the communicating step so that corrective action may be taken.

7. The method according to claim 6, further comprising the steps of:

moving said video monitor and said video cassette recorder on a portable cart to where the questioned article is located; and re-labeling all the articles in question with a printer carried on said portable cart.

8. The method according to claim 7, further comprising the step of:

transferring to a remote location said recorded video images and audio communications.

* * * * *